P. BURKE.
PLANTER.
APPLICATION FILED JUNE 1, 1914.
1,147,480.
Patented July 20, 1915.
Fig. 1.
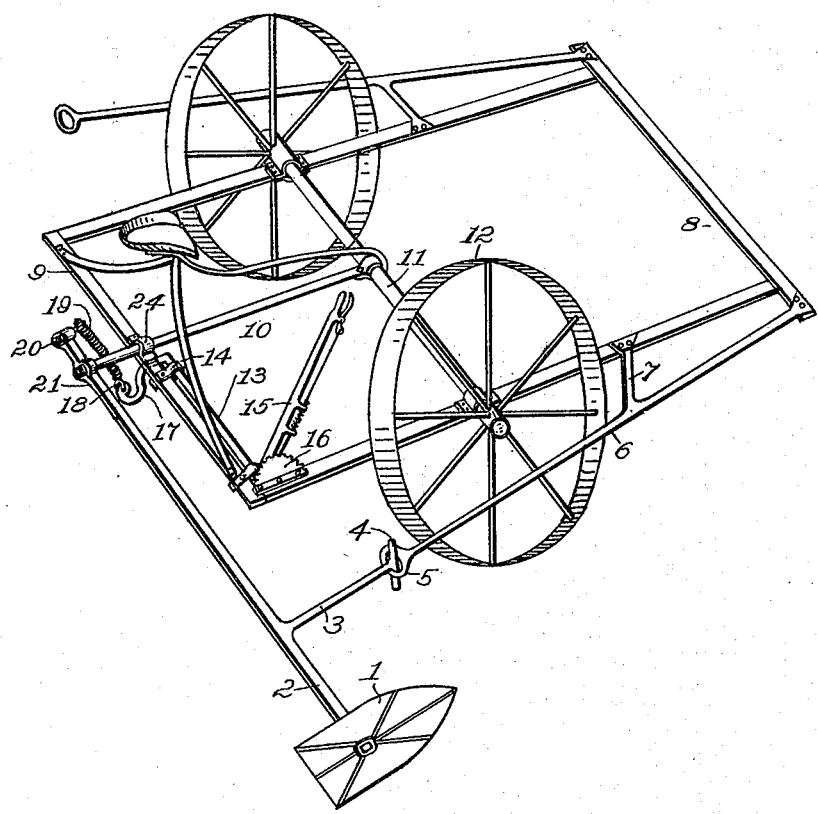
Fig. 2.
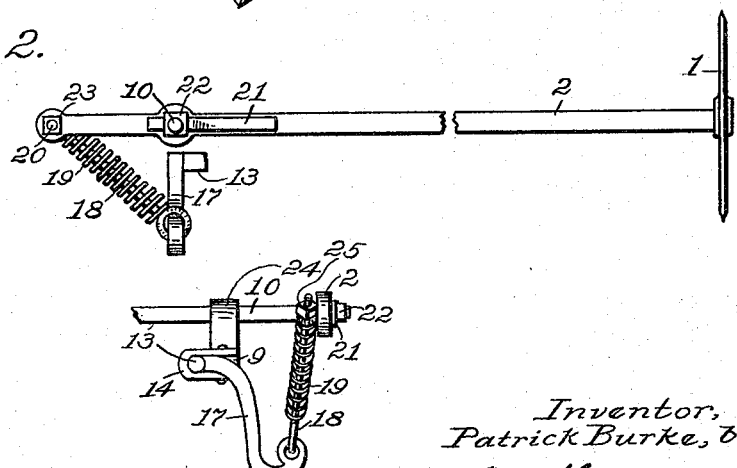
Fig. 3.
Witnesses:
C. Luidner
Pearl Stanton
Inventor,
Patrick Burke, by
G. C. Kennedy,
Attorney.

UNITED STATES PATENT OFFICE.

PATRICK BURKE, OF MASONVILLE, IOWA.

PLANTER.

1,147,480.     Specification of Letters Patent.     Patented July 20, 1915.

Application filed June 1, 1914. Serial No. 842,182.

*To all whom it may concern:*

Be it known that I, PATRICK BURKE, a citizen of the United States of America, and a resident of Masonville, Buchanan county, Iowa, have invented certain new and useful Improvements in Planters, of which the following is a specification.

My invention relates to improvements in planters, and particularly to marker-bars therefor, and an object of my improvement is to provide actuating-means adapted to rock the marker-bar of the planter transversely to and fro across the latter to permit of using the same on either side thereof, and a further object is to supply supporting-means on opposite sides of the planter adapted to receive the marker-bar detachably when lowered into its operative position. These objects I have accomplished by the means which are hereinafter described and claimed, and which are illustrated in the accompanying drawings, in which:

Figure 1 is a perspective view of the wheeled frame only of a planter, having my improved means thereon for rocking and supporting a marker-bar. Fig. 2 is a rear elevation of the marker-bar and the link-connection therefrom to the rock-shaft, with parts broken away. Fig. 3 is a side elevation of said link-connection.

Similar numerals of reference denote corresponding parts throughout the several views.

Referring first to Fig. 1, the numeral 8 denotes a rectangular frame supported on the axle 11 of a pair of carrying-wheels 12, and whose rear cross-bar 9 is provided with a seat 24 for the fixed bar 10, the latter located in the medial longitudinal line of the frame and projecting to the rear, with its forward end secured to the axle 11. The numeral 2 denotes a transversely-arranged marker-bar, long enough to project for a distance beyond the said frame laterally and furnished with a double-edged marking-blade 1 at its outer end. This marker-bar is pivotally mounted on the rear end of the fixed bar 10, secured by a nut 22, and has in its short arm a transverse bolt-hole to receive an eye-bolt 20 secured by a nut 23. A flat spring 21 is orificed to be seated on the bar 10 between the nut 22 and the marker-bar to bear resiliently on the latter and keep it in a proper transverse position. A rock-shaft 13 is mounted in bearings 14 on the frame-bar 9 and has a hand-lever 15 fixed on one end, the latter having a manually-operable detent adapted to be engaged with teeth on a rack-segment 16 fixed on the adjacent side-bar of the frame. The other end of said rock-shaft is provided with a crank or rock-arm 17 located in the medial longitudinal line of the frame to rock vertically under the said fixed bar 10. The end of said arm has an eye in which is swiveled the eye of an eye-bar 18, the latter passed slidingly upwardly through the eye of said eye-bolt 20 and secured by a nut 25 adjustably thereto. A coiled compression-spring 19 is mounted about the said eye-bar 18 to bear against the eye-bolt and yieldingly permit play of the latter over the former when the arm 17 is rocked. The numeral 6 denotes a rearwardly extending arm fixedly bracketed to the front bar of the frame outside thereof and supported by a fixed connection 7. Arms of this kind are placed on opposite sides of said frame, and have at their rear ends the eyes 5 adapted to detachably receive respectively the up and down directed projections 4 on the forward end of the arm 3 fixedly projecting forwardly from the marker-bar 2, and serving to support said bar and limit its downward movement at either side.

To rock the marker-bar 2 to either side, the hand-lever is first swung rearwardly to bring the bar to a vertical position, and then swung forwardly to rock the bar through the remainder of its movement to the opposite side of said frame. The operation is effected by the rocking of the crank 17 which causes the eye-bar 18 to act upon the eye-bolt 20 and bar 2 appropriately, the spring 19 yielding enough to permit the eye-bar to swing about without interference. The hand lever is placed to one side of the driver's seat and is, therefore, easy to manipulate in shifting said marker-bar to and fro.

Having described my invention, what I claim as new, and desire to secure by Letters Patent, is:

1. In combination, a frame mounted for transportation, a transversely-arranged marker-bar having a pivotal connection to the middle of the rear part of the frame and projecting laterally for a distance, a rock-arm mounted in said frame medially and longitudinally to rock vertically, and a link-connection between the outer end of said rock-arm and the adjacent end of said marker-bar, comprising an eye-bar having its eye pivoted to the end of the rock-arm, an eye-bolt secured to the end of the marker-bar, the other end of said eye-bar being passed through the eye of said eye-bolt, securing-means on said eye-bar to prevent its withdrawal from said eye-bolt, and a coiled spring mounted on said eye-bar between its eye and the eye of said eye-bolt.

2. In a planter, a transverse marker-bar pivoted thereto and extending laterally therebeyond, a rock-shaft provided with a crank adapted to rock vertically, a hand-lever fixed on said rock-shaft, and a linking-connection between said crank and said marker-bar, comprising an eye-bar movably connected to the crank, a compression-spring mounted on said eye-bar, an eye-bolt pivotally mounted on said marker-bar with the end of the eye-bar passed through its eye slidably and said spring engaged between the said eye and the opposite part of the eye-bar, and adjustable securing-means mounted upon the extremity of said eye-bar to adjustably extend the eye-bar relatively to the eye-bolt.

Signed at Waterloo, Iowa, this 21st day of May, 1914.

PATRICK BURKE.

Witnesses:
  Geo. C. Kennedy,
  Pearl Santon.

Copies of this patent may be obtained for five cents each, by addressing the "Commissioner of Patents, Washington, D. C."